(12) United States Patent
Curtis et al.

(10) Patent No.: US 7,676,806 B2
(45) Date of Patent: Mar. 9, 2010

(54) DEPLOYMENT, MAINTENANCE AND CONFIGURATION OF COMPLEX HARDWARE AND SOFTWARE SYSTEMS

(75) Inventors: Pavel Curtis, Bellevue, WA (US); Robert Schumaker, Redmond, WA (US); David A. Nichols, Redmond, WA (US); Eshwar Somashekar, Seattle, WA (US); Guo-Wei Shieh, Sammamish, WA (US); Puja Gomber, Bellevue, WA (US); Adil Faisal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 11/236,203

(22) Filed: Sep. 27, 2005

(65) Prior Publication Data

US 2007/0074203 A1 Mar. 29, 2007

(51) Int. Cl.
*G06F 9/445* (2006.01)
(52) U.S. Cl. .................. 717/177; 717/168; 717/172; 717/174
(58) Field of Classification Search .......... 717/168–178
See application file for complete search history.

(56) References Cited

U.S. PATENT DOCUMENTS

| | | | |
|---|---|---|---|
| 4,558,413 A | 12/1985 | Schmidt et al. | |
| 5,347,649 A | 9/1994 | Alderson et al. | |
| 5,432,795 A | 7/1995 | Robinson | |
| 5,931,904 A | 8/1999 | Banga et al. | |
| 5,933,827 A | 8/1999 | Cole et al. | |
| 5,999,740 A * | 12/1999 | Rowley | 717/173 |
| 6,070,184 A | 5/2000 | Blount et al. | |
| 6,286,046 B1 | 9/2001 | Bryant | |
| 6,456,306 B1 | 9/2002 | Chin et al. | |
| 6,892,382 B1 * | 5/2005 | Hapner et al. | 717/168 |
| 6,934,934 B1 | 8/2005 | Osborne, II et al. | |
| 7,080,370 B1 | 7/2006 | Crowl et al. | |
| 7,334,005 B2 * | 2/2008 | Sobel | 707/203 |
| 7,421,458 B1 | 9/2008 | Taylor et al. | |
| 2003/0014470 A1 | 1/2003 | Iijima | |
| 2003/0093563 A1 | 5/2003 | Young et al. | |
| 2003/0221190 A1 * | 11/2003 | Deshpande et al. | 717/171 |
| 2004/0187103 A1 | 9/2004 | Wickham et al. | |

(Continued)

OTHER PUBLICATIONS

Carzaniga et al., A characterization framework for software deployment technologies, University of Colorado Department of Computer Science, 1998; pp. 1-24.*

(Continued)

*Primary Examiner*—Wei Y Zhen
*Assistant Examiner*—Satish Rampuria
(74) *Attorney, Agent, or Firm*—Perkins Coie LLP

(57) ABSTRACT

Techniques for deploying, maintaining and configuring complex hardware and software systems are provided. An abstract configuration of the system describes the system's desired state. Each component of the system declares the general form of the resources it requires and an abstract representation of the versions of the services it both requires and provides. A configuration process uses the abstract configuration of the system and the descriptions of each of the components in the system to validate that the system can operate effectively, ensures that each component is in the correct state and at the right version, and generates the necessary interconnections for the application components to interoperate with each other.

16 Claims, 12 Drawing Sheets

U.S. PATENT DOCUMENTS

| | | | |
|---|---|---|---|
| 2005/0108557 | A1 | 5/2005 | Kayo et al. |
| 2005/0125461 | A1 | 6/2005 | Filz |
| 2005/0203969 | A1 | 9/2005 | Kawabe |
| 2005/0289536 | A1 | 12/2005 | Nayak et al. |
| 2006/0037012 | A1* | 2/2006 | Zomaya et al. ............ 717/168 |
| 2006/0190594 | A1 | 8/2006 | Jorgenson et al. |
| 2006/0200450 | A1 | 9/2006 | Keane et al. |
| 2007/0074204 | A1 | 3/2007 | Curtis et al. |

OTHER PUBLICATIONS

Diot et al., Deployment issues for the IP multicast service and architecture; IEEE, 2000, pp. 1-18.*

Cook, J.E. et al., "Highly Reliable Upgrading of Components," IEEE, 1999, pp. 203-212 [downloaded Nov. 6, 2008].

Soundarrajan et all, "Using Black-Box Persistent State Manifest for Dependency Management in Patching and Upgrading J2EE Based Applications," IEEE., 2005, pp. 518-523 [downloaded Dec. 6, 2008].

Tai et al., "Onboard Guarded Software Upgrading: Motivation and Framework," IEEE, vol. 2, Oct. 24-29, 1999, pp. 5-2421-5-2426.

U.S. Appl. No. 11/236,413, filed Sep. 27, 2005, Curtis et al.

Li, J.J.; Xueshan Shan, "A Case Study of Dependable Software Upgrade with Distributed Components," IEEE, pp. 1-6, 2002.

Li, J.J.; Mulcare D.B.; Wong, W.E.; "Dependability of Complex Software Systems with Component Upgrading," IEEE., pp. 413-418, 2000.

Brada, P.; "Metadata Support for Sale Component Upgrades," IEEE, pp. 1-5, 2002.

* cited by examiner

DEPLOYMENT, MAINTENANCE AND CONFIGURATION OF COMPLEX HARDWARE AND SOFTWARE SYSTEMS

RELATED APPLICATIONS

The present application is related to the following co-pending and commonly owned U.S. patent applications:
1. U.S. patent application Ser. No. 11/236,413, filed Sep. 27, 2005, entitled APPLICATION HEALTH CHECKS; and
2. U.S. patent application Ser. No. 11/236,313, filed Sep. 27, 2005, entitled UPGRADE AND DOWNGRADE OF DATA RESOURCE COMPONENTS.

Each of the above referenced patent applications is incorporated by reference herein in their entireties.

BACKGROUND

Complex software applications can no longer be designed and built as a monolithic system. Instead, the outward expression of the system can only be achieved by a cooperating set of programs. As each of these underlying programs also become more complex, they require more and more computing resources. These two principles primarily drive complex multiple machine software systems to require multiple cooperating computer programs spanning multiple pieces of computer hardware.

Complex multiple machine software systems require the deployment and configuration of software components on multiple machines. While a handful of cooperating software components and their associated resources can be configured and maintained "by hand" (e.g., an administrator specifies the configuration information and installs the appropriate software components on each machine), as the number of components increases, the system rapidly becomes harder to manage. For example, as the number of software components and machines increases, configuration and maintenance of the system by hand becomes more difficult and prone to human error.

Adding complexity to the problem, upgrading (or downgrading) versions of individual software components as new versions become available (or new versions need to be rolled back to prior versions) requires that the interaction of different "strains" or versions of the software be managed at the same time. Managing the different strains of software components by hand becomes more difficult and increasingly prone to human error, particularly as the number of software components, and versions of the software components increases.

SUMMARY

Techniques for deploying, maintaining and configuring complex hardware and software systems are provided. An abstract configuration of the system describes the system's desired state. Each component of the system declares the general form of the resources it requires and an abstract representation of the versions of the services it both requires and provides. A configuration process uses the abstract configuration of the system and the descriptions of each of the components in the system to validate that the system can operate effectively, ensure that each component is in the correct state and at the right version, and generate the necessary interconnections for the application components to interoperate with each other.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
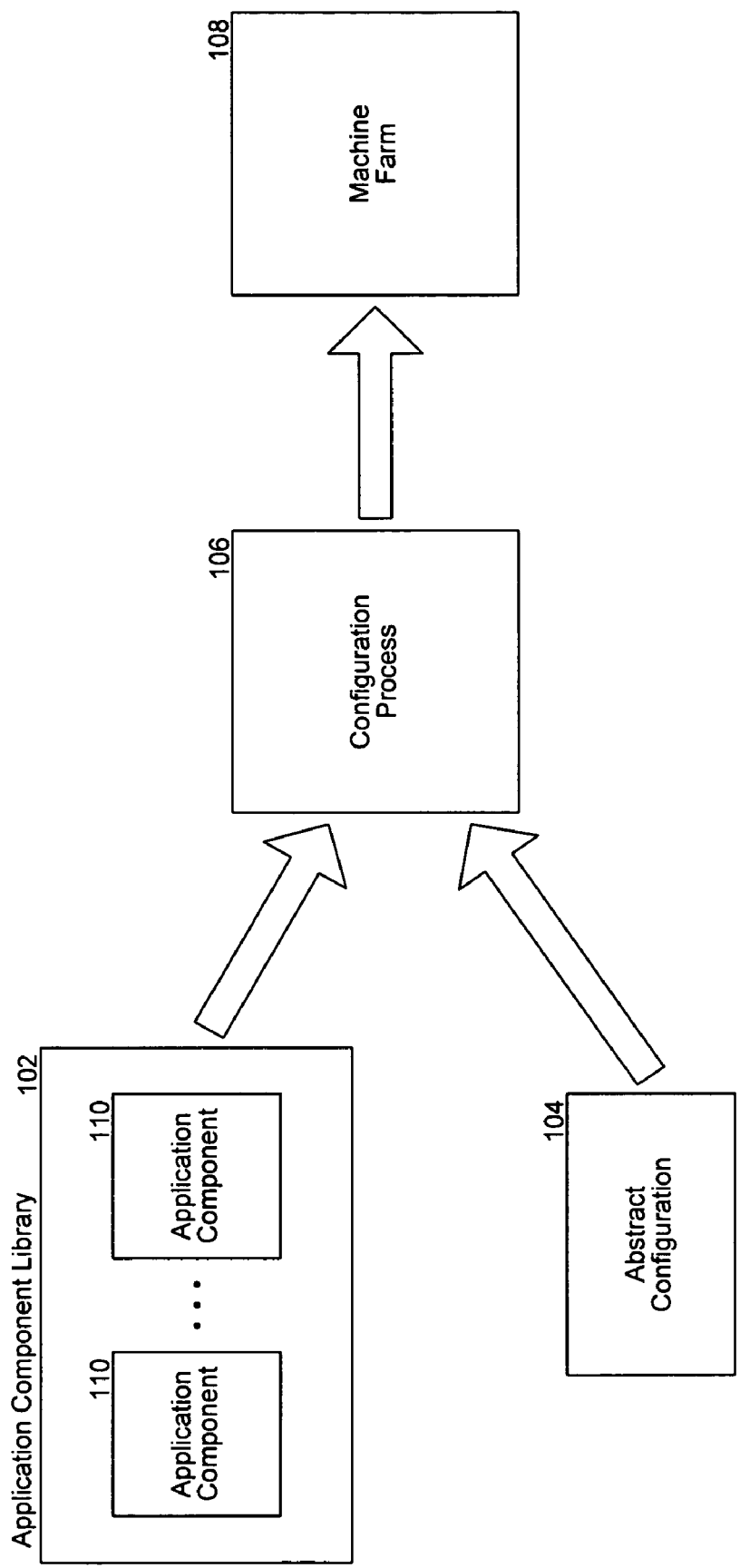
FIG. 1 is a high-level block diagram showing an environment in which a configuration process may operate, according to some embodiments.

Various techniques for coordinating large numbers of machines and application components, managing multiple version changes across the application components, and interconnecting disparate application components in a repeatable and scalable manner, are provided. Application components may be, by way of example, software components and data resource components, such as a database, a file tree, etc. In some embodiments, a configuration process (also referred to herein as the "facility") receives as input an abstract configuration of a system and the descriptions of each of the components in the system, and validates that the system can operate effectively, ensures that each component is in the correct state and at the right version, and generates the necessary interconnections for the application components to interoperate with each other. The abstract configuration of the system describes the system's desired state. Each component of the system declares the general form of the resources it requires and an abstract representation of the versions of the services it both requires and provides. A user, such as a system administrator or an application administrator may specify the abstract configuration of the system and the declaration of the resources required by the components in the system.

In some embodiments, the facility utilizes the abstract configuration (i.e., the description of the system) to discover the requisite software component descriptors, and to formulate a plan to deploy the software on the specified machines. The facility validates the existence of the necessary resources for each software component, and checks each software component and its associated data resource components for version compatibility. For example, where specific instances of the software components do not yet exist on a machine, the facility creates appropriate instances of the correct version of the software components on the machine. Likewise, where specific resources do not yet exist, the facility installs and initializes the necessary resources. In the case of data resource components, where specific instances of the data resource components do not yet exist on a machine, the facility creates appropriate instances of the correct version of the data resource components on the machine. Where a data resource component already exists on the machine but is not the correct version, the facility may attempt to automatically upgrade or downgrade the data resource component as necessary. Once the necessary software components and data resource components are deployed on the machines, the facility creates run-time linkages between the software components and their respective data resource components.

In some embodiments, the abstract configuration allows for defining or specifying "pools" of software components and hardware resources in a system. Within a pool, the individual components can be interrupted without interrupting the overall functioning of the system from, for example, a client perspective. Defining pools of components in the abstract configuration of the system enables the facility to move the system from a current state to a newly described state in a minimally interruptive fashion. Generally, pools may be used to describe a collection of machines and/or application components that act to users as if there were only one of them (i.e., machine), but which actually comprise multiple instances. This provides for load balancing (i.e., carrying more load than any single instance could support, fairly well balanced across the members of the pool) and/or higher availability (i.e., the pool will still appear to users to be up and working even if one or more of its members are down, so long as at least one member is still up). The deployment facility can use this information, for example, to perform an upgrade to the members of the pool by taking only one down at a time, thereby never interrupting service to users.

In some embodiments, an application component may include an up/down tool that may be used to upgrade/downgrade the application component from one version of the application to another version of the application. The up/down tool may comprise an up/down process, a version identifier, and one or more version conversion rules. The up/down process contains the logic for upgrading/downgrading the application component using appropriate version conversion rules. The version identifier indicates the version of the application component. The version conversion rules are the rules and/or commands that are executed in order to change the application component from a first version to a second version. In the case of a software application, the version conversion rules may be as simple as an instruction to stop execution of the currently executing version of the software application, and instructions to load and configure the desired version of the software application. In the case of a data resource component, such as a database, the version conversion rules may be a description of the database schema for converting the data resource component from one version to another version. For example, the version conversion rules for converting a database from version 1 to version 2 may contain one or more SQL statements for converting the database tables from version 1 to version 2. A user, such as an application programmer or other knowledgeable person, may develop the up/down tool, including the logic associated with the components of the up/down tool. The facility may then execute the up/down process provided with the up/down tool upon detecting that a data resource component on a machine is not the desired version.

In some embodiments, an application component may include a relative address of a test point, where the relative address is an address that is relative to the application component. The test point is something that can be used to determine the health of an instance of the application component. Stated another way, the test point describes a way to ask an instance of the application component whether the executing instance of the application component is currently healthy. For example, a web application (i.e., an application component that defines or corresponds to a web application) may provide a web page as its test point. When the web page is fetched, the page's contents can provide an indication of the status or health of the web application. Other applications may provide a variable, such as a performance counter, as its test point. The value of the performance counter can then be used to determine the health of the application. For example, depending on the application, the performance counter may need to be within a range of values for the application to be healthy, or the performance counter may need to be increasing in order for the application to be healthy, and the like.

In some embodiments, a process, such as the facility or other suitable process that is interested in determining the health of an instance of an application component may use the relative address of a test point and the abstract configuration of the system to determine the actual address or location of the test point within the system. The relative address of the test point is an address or location of the test point that is relative to the application component. For example, in the case where the test point is a web page, the relative address of the test point may be the name of the web page. In the case where the test point is a variable, the relative address of the test point may be the name of the variable. The process can determine from the information in the abstract configuration the locations of the instances of the application component within the system. The process is able to determine the location or locations of the instance or instances of the application component within the system because the abstract configuration specified the machine or machines, and the location (e.g., directory) within the machine or machines, on which the application component was to be deployed. The process can then use the relative address of the test point and the locations of the instances of the application component within the system to derive or calculate an actual address or addresses (e.g., a complete URL) for the test point.

In some embodiments, the collection of test points corresponding to the instances of the application components that comprise a system, for example, as specified by the abstract configuration of the system, may be used to check or determine the health of the system. A process that is interested in determining the health of the system can determine the actual location of each test point corresponding to each of the instances of the application components that comprise the system from the relative address of the test point and the information in the abstract configuration. The process can then use the actual locations of the test points to check the health of the system.

FIG. 1 is a high-level block diagram showing an environment in which a configuration process may operate, according to some embodiments. As depicted, the environment comprises an application component library 102, an abstract configuration 104, a configuration process 106, and a machine farm 108. The application component library is a collection of application components 110 that are available for deployment within a system. The application components are the software applications, data resource applications, and other components that potentially could be deployed within the system. Application components are further discussed below.

The abstract configuration is an abstract description of a system. The abstract configuration specifies the overall structure and layout of the system. For example, the contents of the abstract configuration may specify a list of the machines and the application components that are going to run on each of the machines. For each application component, the abstract configuration may also specify the location of the resources that are needed by the application component. In this manner, the abstract configuration describes the machines that comprise the system, the applications that are to execute on each of the machines, and the manner in which to connect the machines and applications to create the system. In one embodiment, the abstract configuration may be implemented as an XML file that is prepared by a user, such as a system architect.

In general terms, the configuration process takes the abstract configuration of the system and combines it with the description of each of the application components, and more generally, the description of each of the applications included in the application component library to generate the final state of the system. In some embodiments, the configuration process inspects the relationships between each application component, and applies constraints to verify that each application component has all of its resource requirements satisfied. The configuration process may compare the desired version of each application component, for example, as specified by the abstract configuration, against the version of the application component that may already be executing. If differences between the desired version and a currently executing version exist, the configuration process may move the executing application component to the desired version, as necessary. For example, where specific instances of the desired versions of the software components do not yet exist, the configuration process can invoke the desired versions of the software components. Where specific resources do not exist, the configuration process can install and initialize the necessary resources. Where specific instances of the desired versions of the data resources do not yet exist, the configuration process can create the appropriate instances of the data resource components. Where the data resources already exist, but are not at the desired version, the configuration process automatically performs the upgrading or downgrading of the data resource version as necessary. Once the appropriate versions of the software components and data resources are deployed on the machines as specified by the abstract configuration, the configuration process may create the run-time linkages between the software components and their respective data resources as specified by the abstract configuration. Stated another way, the configuration process may configure each software component with the necessary references to the external resources as expressed by the abstract configuration.

The machine farm comprises the machines that are available for hosting (i.e., executing) instances of the application components. The machine farm is the collection of machines on which the application components are to be deployed. The machines may include, by way of example, computing devices, network components, and other suitable microprocessor or processor controlled devices. For example, the machine farm may be the computers and other testing components in a test lab. The machine farm may also be a collection of distributed computers coupled, for example, via one or more networks within an enterprise on which to deploy the application components.

The computing device on which the configuration process, application component library and abstract configuration may be implemented and executed may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the configuration process, application component library and abstract configuration may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, client computers, server computers, programmable consumer electronics, digital cameras, and so on.

The configuration process, application component library and abstract configuration may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
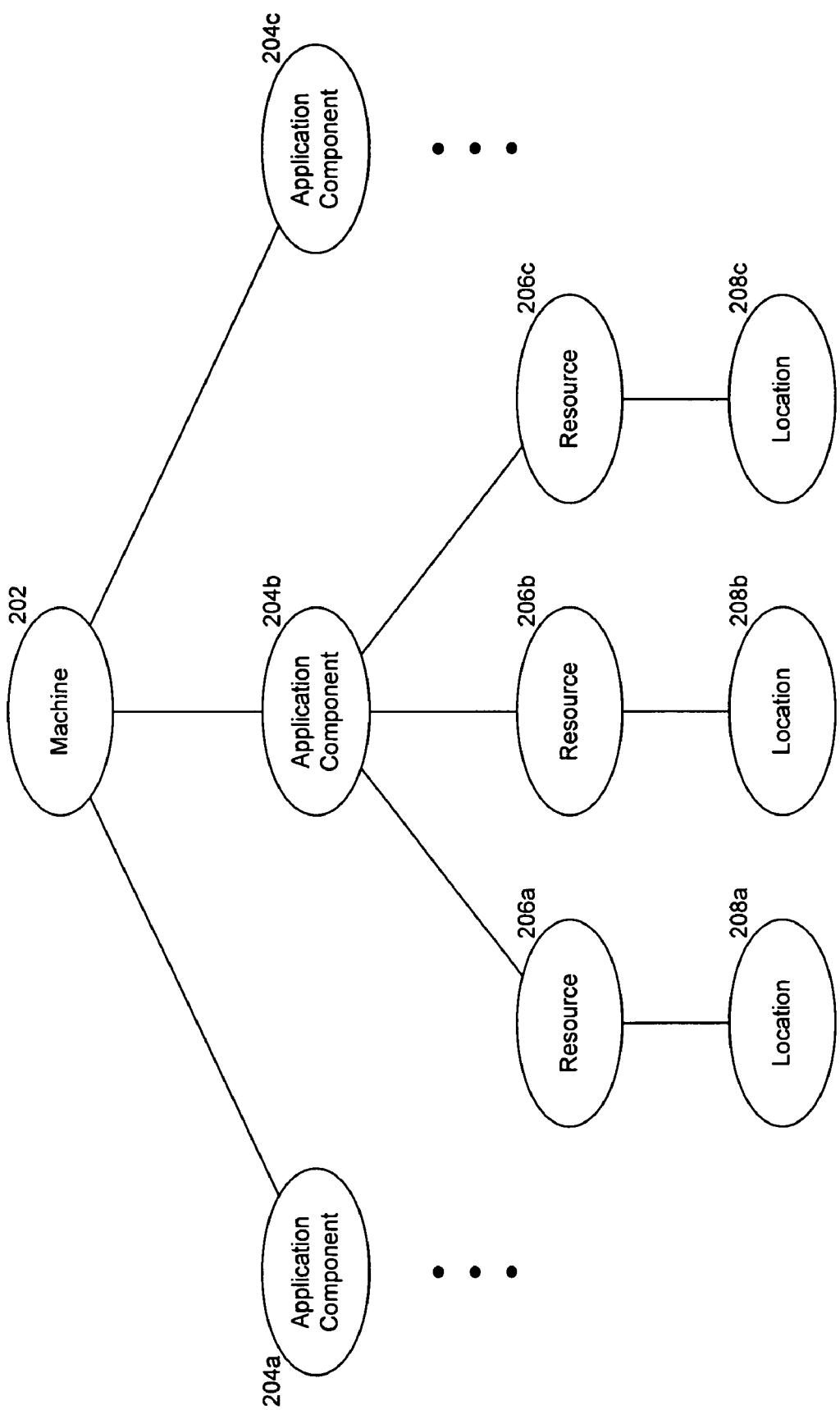
FIG. 2 is a diagram illustrating an example machine configuration, according to some embodiments.

FIG. 2 is a diagram illustrating an example machine configuration, according to some embodiments. The machine configuration defines the application components that are to be invoked on the machine, and for each application hosted on the machine, the location of any resources that may be required by the application. The machine configurations for each machine in a system are included as part of the abstract configuration that specifies the overall structure and layout of the system. As depicted by way of example in FIG. 2, a machine 202 in the system is configured to include three application components 204a-c. This indicates that instances of application components 204a-c are to be invoked on machine 202. The configuration information further indicates that application component 204b that is to be executing on machine 202 requires three resources 206a-c, which are to be found at locations 208a-c, respectively. In a similar manner, the machine configuration for machine 202 specifies the resources that are needed for applications 204a and 204b, and for each needed resource, the location of the resource. For example, assuming application component 204b is a web application, and resource 206a is a database that is utilized by the web application, location 208a specifies the location where the web application (i.e., instance of application component 204b) executing on machine 202 can find and access the database (i.e., resource 206a). One skilled in the art will appreciate that the resource may be any resource that may be accessed or utilized by an application, including output channels, input channels, network components, other applications, data resources, etc.

Figure 3:
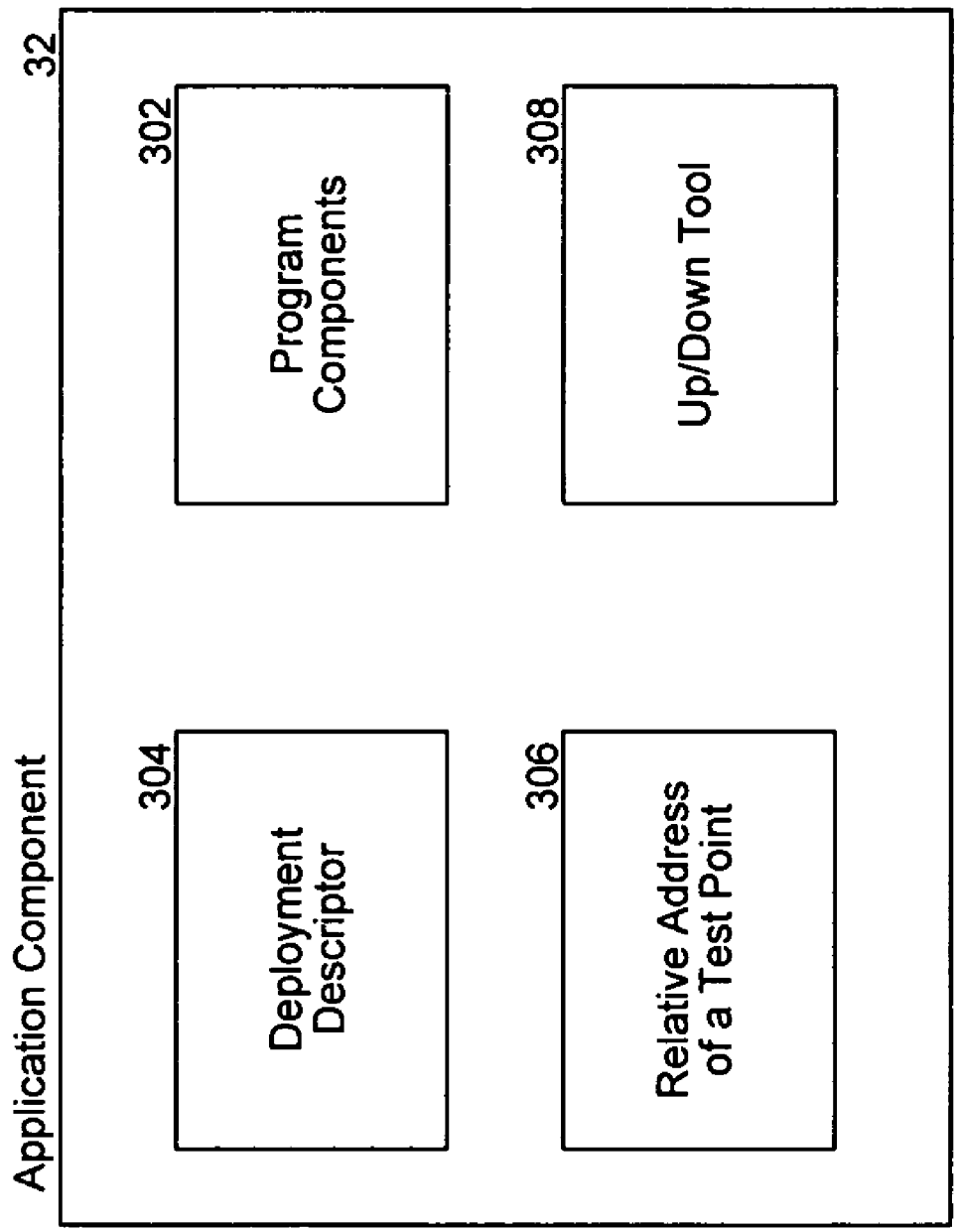
FIG. 3 is a block diagram illustrating an example application component, according to some embodiments.

FIG. 3 is a block diagram illustrating an example application component, according to some embodiments. An application component 32 comprises program components 302, a deployment descriptor 304, a relative address of a test point 306, and an up/down tool 308. The application component defines an application entity, such as, by way of example, a software component (e.g., application program, operating system, etc.), a data resource component (e.g., database, directory tree, etc.), etc., which may be deployed within the system. Moreover, there is an application component for each version of an application entity. The program components are the program or programs that comprise the application component. For example, if the application component defines a database schema, the program components may be the database server programs that are deployed and invoked on a machine to create an instance of the database on the machine.

The deployment descriptor specifies the resources that the application component needs to execute properly. Stated another way, the deployment descriptor describes the "things" the application component needs to function properly. For example, for a software component, the deployment descriptor may indicate the desired data resources and environmental information that an instance of the software component requires to deploy and function properly. For a data resource component, the deployment descriptor may be an abstract description of the data resource and provide a description of the services provided by the data resource component. In some embodiments, the deployment descriptor may be implemented as an XML file.

The up/down tool is a set of procedures that may be executed to upgrade or downgrade an instance of the application component from one version to another version. The up/down tool may be dynamically invoked, and may be queried as to the version of the application component supported by the up/down tool. In some embodiments, the up/down tool is provided with data resource components. The up/down tool is further discussed below. The relative address of a test point specifies an address of a test point relative to the application component. The test point provides an indication of the current health of an instance of the application component executing on a machine. The test point may be a process, URL, or other object that may be invoked or accessed to obtain information regarding the health of the application component instance. The relative address of a test point is further discussed below.

The aforementioned components of the application component are only illustrative and are not intended to suggest any limitation as to the implementation of the illustrated components and/or the scope of use or functionality of the application component. Depending on the application component, one or more of the components may be optional and not included. For example, while the up/down tool is included for data resource components, the up/down tool may be optional and not included for software components. Likewise, the relative address of a test point may also be optional and not included in some application components.

Figure 4:
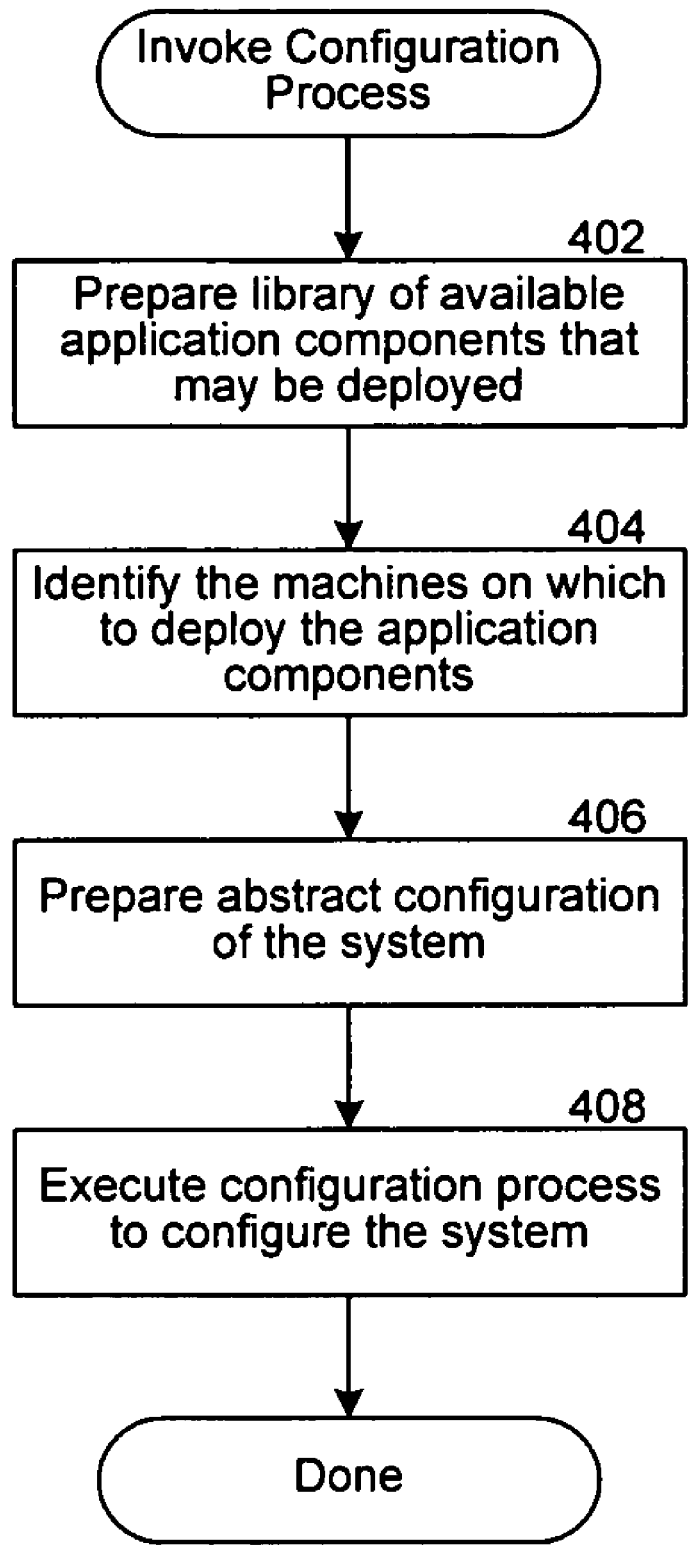
FIG. 4 is a flow diagram that illustrates the invoking of the configuration process, according to some embodiments.

FIG. 4 is a flow diagram that illustrates the invoking of the configuration process, according to some embodiments. In block 402, a user, such as a system administrator, prepares a library of available application components that may be deployed within a system. The library of application components may include only the application components that are going to be deployed in the system, or may include additional application components, such as other versions of application components, in addition to the application components that are going to be deployed in the system. In block 404, the user identifies the machines on which to deploy the application components. The identified machines are the machines that comprise the system and which will host the instances of the application components. In block 406, the user prepares the abstract configuration of the system. In block 408, the user invokes the configuration process to configure the system as defined by the abstract configuration prepared in block 406.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 5:
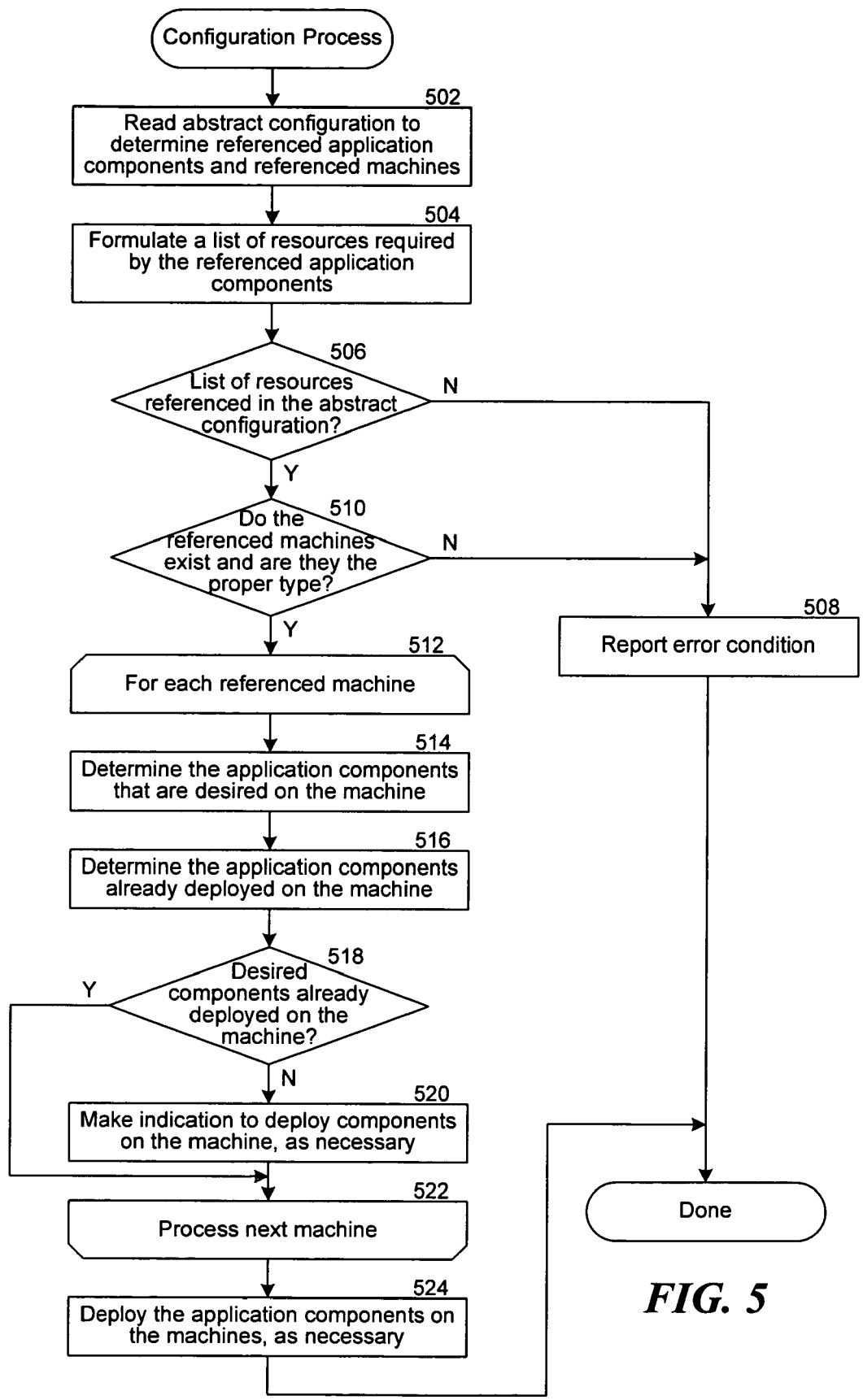
FIG. 5 is a flow diagram that illustrates the processing of the configuration process, according to some embodiments.

FIG. 5 is a flow diagram that illustrates the processing of the configuration process, according to some embodiments. The configuration process is passed an indication of an abstract configuration, an application component library, and a machine farm. In block 502, the configuration process reads the abstract configuration to determine the application components and the machines referenced in the abstract configuration. In block 504, the configuration process formulates a list of the resources required by the referenced application components. In block 506, the configuration process checks to determine whether the resources in the list of resources are referenced in the abstract configuration. Stated another way, the configuration process checks to determine whether the resources that are needed by the referenced application components to function properly are specified (i.e., referenced) in the abstract configuration. In this block, the abstract configuration is checking each of the deployment descriptors corresponding to the referenced application components to ensure that the application components can be linked up in the manner specified by the abstract configuration.

If, in block 506, the configuration process determines that the resources in the list of resources are not all referenced in the abstract configuration, then, in block 508, the configuration process reports the error condition. For example, the configuration process may create an entry in a log file that indicates the references in the list of references that were not referenced in the abstract configuration. Otherwise, if, in block 506, the configuration process determines that the resources in the list of resources are referenced in the abstract configuration, then, in block 510, the configuration process checks to determine whether the all of the referenced machines exist and whether the machines are of the proper type. The configuration process checks the machine farm for the existence of each of the machines referenced in the abstract configuration and, for each machine, the configuration process checks to ensure that the machine is the type specified in the abstract configuration. For example, the abstract configuration may reference a Machine XYZ as a database server. In this instance, the configuration process checks the machine farm for the existence of Machine XYZ and also checks to make certain that Machine XYZ is a database server of the type indicated by the abstract configuration. Similarly, if the abstract configuration referenced a Machine Fu as a web server, the configuration process checks the machine farm for the existence of Machine Fu and also checks to make certain that Machine Fu is a web server of the type indicated by the abstract configuration.

If, in block 510, the configuration process determines that not all of the referenced machines exist or the machines are not of the proper type, then, in block 508, the configuration process reports the error condition. For example, the configuration process may create an entry in a log file that indicates the machines that do not exist and/or the machines that are of the improper type. Otherwise, if, in block 510, the configuration process determines that all of the referenced machines exist and the machines are of the proper type, then, for each referenced machine (block 512), the configuration process performs blocks 514 to 520, until all the referenced machines are processed (block 522).

In block 514, the configuration process determines from the abstract configuration the application components that are desired on the machine. These are the application components to invoke on the machine. In block 516, the configuration process determines the application components that are already deployed on the machine. These are the application components that are already executing on the machine. In block 518, the configuration process checks to determine whether the desired application components are already deployed on the machine. If, in block 518, the configuration process determines that one or more of the desired application components are not already deployed on the machine, then, in block 520, the configuration process makes an indication to deploy the desired components that need to be deployed on the machine. Stated another way, the configuration process makes a list of the desired application components that need to be deployed on the machine. For example, if the abstract configuration indicates that version 1 of Application ABC is to be deployed on Machine X, and the configuration process determines that Machine X currently does not have Application ABC deployed, then, the configuration process makes an indication, for example, in a "ToDo List" to deploy Application ABC on Machine X. Likewise, if the abstract configuration indicates that version 2 of Database DEF is to be deployed on Machine Fu, and the configuration process determines that version 1 of Database DEF is currently deployed on Machine Fu, then, the configuration process makes an indication in the ToDo List to upgrade Database DEF on Machine Fu from version 1 to version 2. Otherwise, if, in block 518, the configuration process determines that the desired application components are already deployed on the machine, or subsequent to making an indication of the desired application components that need to be deployed on the machine, the configuration process, in block 522, processes the next referenced machine in the abstract configuration. In some instances, the deployer may determine that an application component that is already running on a machine is not mentioned in the abstract configuration. For example, it might be because that component was mentioned in the previous revision of the configuration and has been removed in the current revision. Thus, the deployer may actually stop that component from running on that machine as part of achieving the desired configuration state.

Having made a list of the desired application components to deploy on the referenced machines in the abstract configuration, the configuration process, in block 524, deploys the application components on the machines, as necessary. For example, the configuration process may stop a currently executing instance of an application process on a machine, uninstall the application, install a desired application component on the machine, and invoke the installed application component on the machine. For a data resource component on a machine that is a different version than the desired version, the configuration process may use the up/down tool provided with the data resource component to change (i.e., upgrade or downgrade) the data resource component from the current version to the desired version. If a desired data resource component is not currently deployed on the machine, the configuration process can install and invoke the desired data resource component on the machine.

In some embodiments, the abstract configuration may specify pools of machines and application components that are to be deployed on the machines. A pools may describe a collection of machines and/or application components that act to users as if there were only one of them (i.e., machine), but which actually comprise multiple instances. This provides for load balancing (i.e., carrying more load than any single instance could support, fairly well balanced across the members of the pool) and/or higher availability (i.e., the pool will still appear to users to be up and working even if one or more of its members are down, so long as at least one member is still up). The deployment facility can use this information, for example, to perform an upgrade to the members of the pool by taking only one down at a time, thereby never interrupting service to users.

Figure 6:
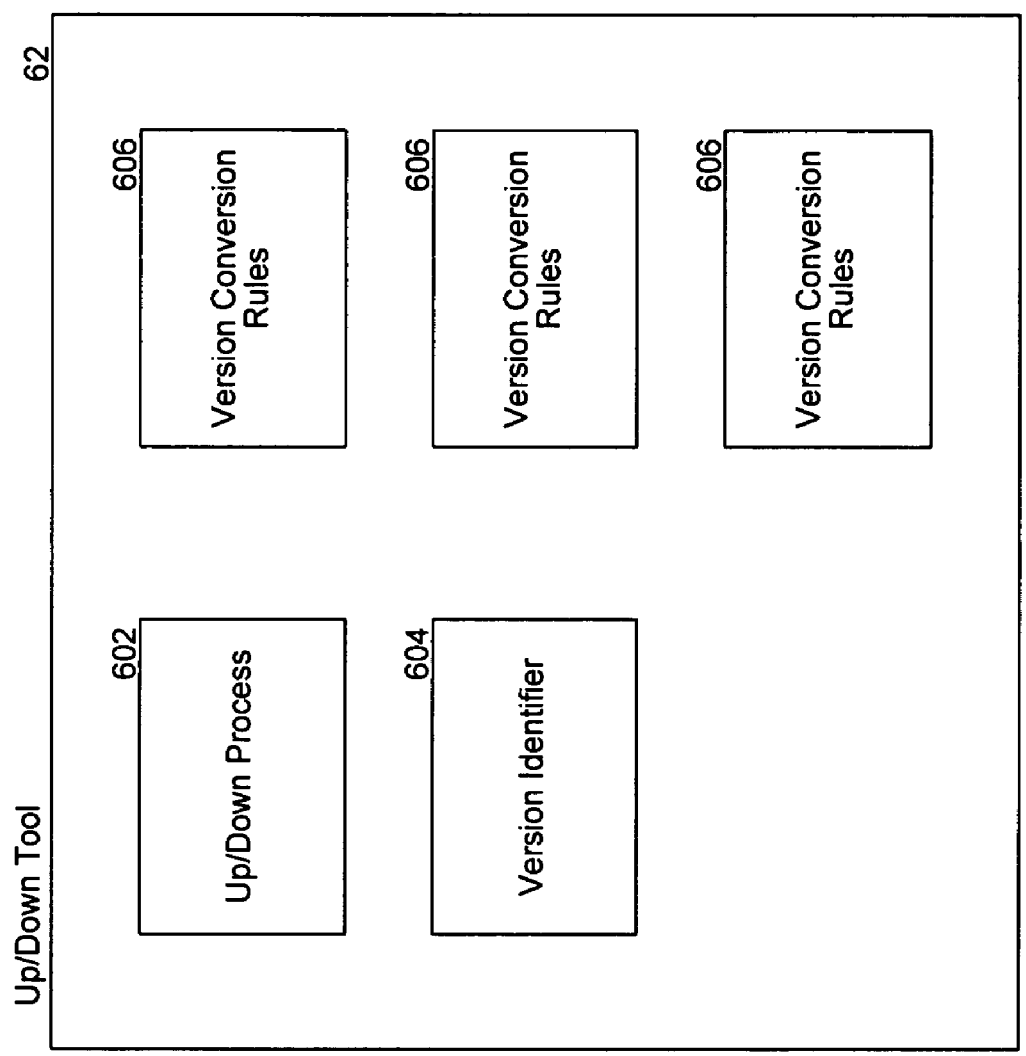
FIG. 6 is a block diagram illustrating components of a generic up/down tool, according to some embodiments.

FIG. 6 is a block diagram illustrating components of a generic up/down tool, according to some embodiments. As depicted, an up/down tool 62 comprises an up/down process 602, a version identifier 604, and a plurality of version conversion rules 606. In some embodiments, an up/down tool is provided with a data resource component. Typically, the up/down tool is prepared by a user, such as a programmer who is familiar with the data resource component and the commands and/or procedures that need to be undertaken to upgrade and/or downgrade the data resource component from one version to another version. The up/down process is the process that is executed, for example, by the configuration process, to determine whether the up/down tool can upgrade or downgrade a current version of a data resource component to a desired version and, if so, to actually upgrade or downgrade the data resource component from the current version to the desired version. The version identifier provides an indication of the version of the data resource component. For example, if the up/down tool is provided with version 2 of a data resource component, the version identifier indicates "version 2."

The version conversion rules are the logic (i.e., the commands) that convert or transform the data resource component from one version to another version. In some embodiments, the version conversion rules may be specified using SQL statements. Only three version conversion rules are shown in FIG. 6 for simplicity and one skilled in the art will appreciate that the actual number of version conversion rules in an up/down tool depend on the functionality provided by the up/down tool. For example, an up/down tool that is capable of upgrading a data resource component from version 0 to version 1, and version 1 to version 2, and downgrading the data resource component from version 2 to version 1, may include three sets of version conversion rules: one set of version conversion rules to upgrade the data resource component from version 0 to version 1 (i.e., to install version 1 of the data resource component on a machine that currently does not have the data resource component deployed); one set of version conversion rules to upgrade version 1 of the data resource component deployed on a machine to version 2; and one set of version conversion rules to downgrade version 2 of the data resource component deployed on a machine to version 1.

Figure 7:
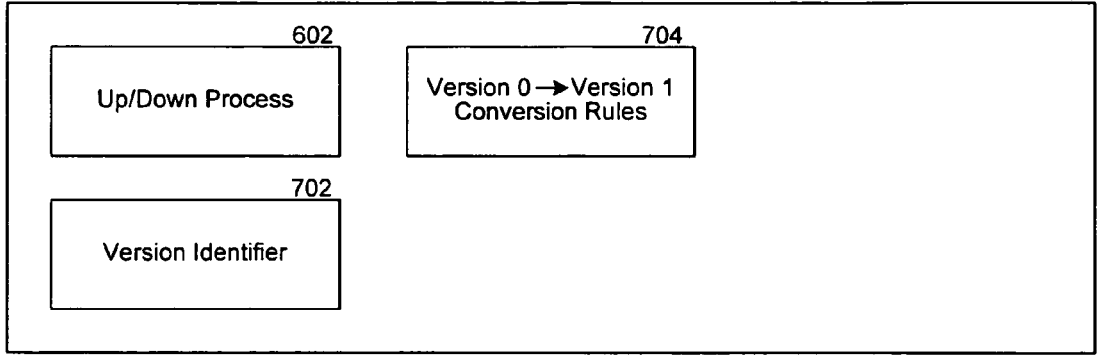
FIG. 7 is a block diagram that illustrates components of example up/down tools of differing versions, according to some embodiments.
Figure 7:
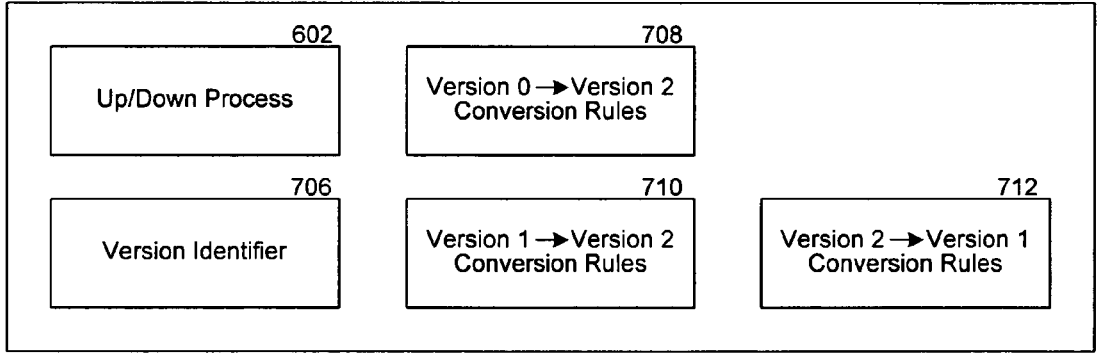
Figure 7:
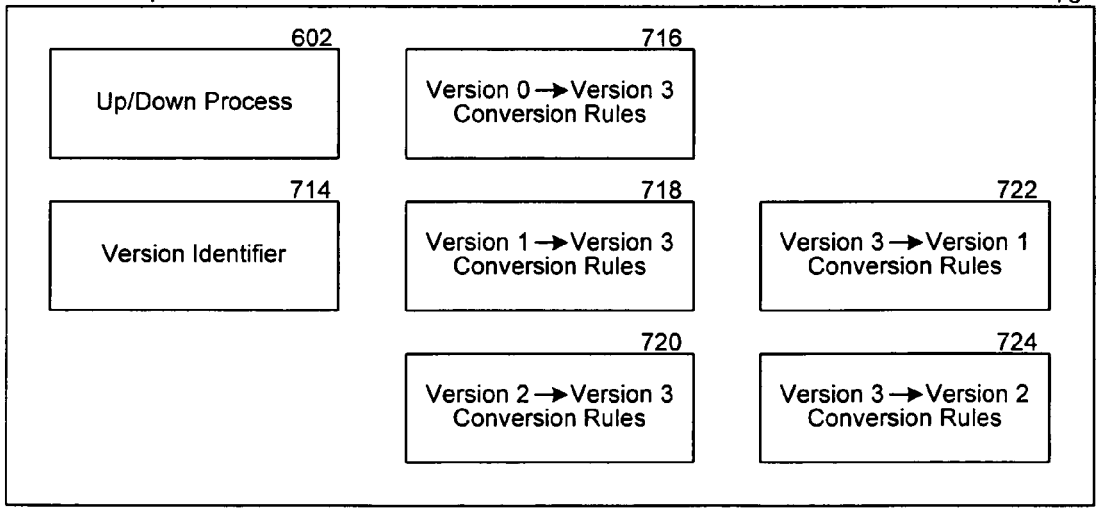

FIG. 7 is a block diagram that illustrates components of example up/down tools of differing versions, according to some embodiments. By way of example, a version 1 up/down tool 72, a version 2 up/down tool 74, and a version 3 up/down tool 76 for a database server is depicted in FIG. 7. The version 1 up/down tool may be provided with an application component corresponding to version 1 of the database server. Likewise, the version 2 up/down tool may be provided with an application component corresponding to version 2 of the database server, and the version 3 up/down tool may be provided with an application component corresponding to version 3 of the database server.

The version 1 up/down tool comprises the up/down process 602, version identifier 702, and a version 0->version 1 conversion rules 704. The up/down process determines whether the particular up/down tool can upgrade or downgrade a current version of the database schema to a desired version and, if so, that actually upgrades or downgrades the database schema from the current version to the desired version. The version identifier indicates that this particular up/down tool is the version 1 up/down tool. The version 0->version 1 conversion rules are the commands that may be executed, for example, by the up/down process, to upgrade version 0 of the database schema to version 1 of the database schema. Therefore, the version 1 up/down tool is capable of upgrading the database schema from version 0 to version 1. Stated another way, the version 1 up/down tool is capable of installing version 1 of the database schema on a machine that does not currently have the database schema.

The version 2 up/down tool comprises the up/down process 602, version identifier 706, a version 0->version 2 conversion rules 708, a version 1->version 2 conversion rules 710, and a version 2->version 1 conversion rules 712. The up/down process is the same as the up/down process described above. The version identifier indicates that this particular up/down tool is the version 2 up/down tool. The version 0->version 2 conversion rules are the commands that may be executed to convert version 0 of the database schema to version 2 of the database schema. The version 1->version 2 conversion rules are the commands that may be executed to upgrade version 1 of the database schema to version 2 of the database schema. The version 2->version 1 conversion rules are the commands that may be executed to downgrade version 2 of the database schema to version 1 of the database schema. Therefore, the version 2 up/down tool is capable of upgrading the database schema from version 0 to version 2, and version 1 to version 2, and downgrading the database schema from version 2 to version 1.

The version 3 up/down tool comprises the up/down process 602, version identifier 714, a version 0->version 3 conversion rules 716, a version 1->version 3 conversion rules 718, a version 2->version 3 conversion rules 720, a version 3->version 1 conversion rules 722, and a version 3->version 2 conversion rules 724. The up/down process is the same as the up/down process described above. The version identifier indicates that this particular up/down tool is the version 3 up/down tool. The version 0->version 3 conversion rules are the commands that may be executed to convert version 0 of the database schema to version 3 of the database schema. The version 1->version 3 conversion rules are the commands that may be executed to upgrade version 1 of the database schema to version 3 of the database schema. The version 2->version 3 conversion rules are the commands that may be executed to upgrade version 2 of the database schema to version 3 of the database schema. The version 3->version 1 conversion rules are the commands that may be executed to downgrade version 3 of the database schema to version 1 of the database schema. The version 3->version 2 conversion rules are the commands that may be executed to downgrade version 3 of the database schema to version 2 of the database schema. Therefore, the version 3 up/down tool is capable of upgrading the database schema from version 0 to version 3, version 1 to version 3, and version 2 to version 3, and downgrading the database schema from version 3 to version 1, and version 3 to version 2.

One skilled in the art will appreciate that an up/down tool may not include every combination of the version conversion rules. For example, the version 3 up/down tool described above may not include one or more of the conversion rules that downgrade the database schema from one version to another version and/or one or more of the conversion rules that upgrade the database schema from one version to another version.

Figure 8:
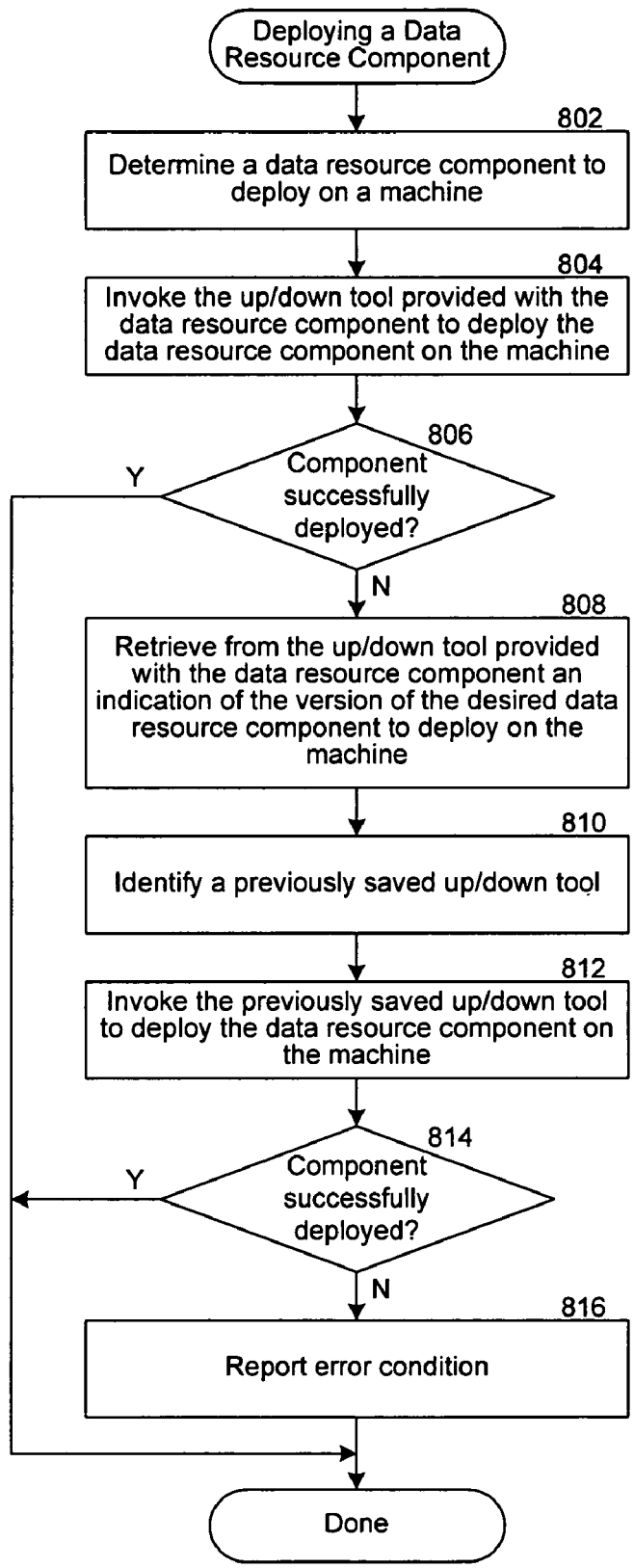
FIG. 8 is a flow diagram that illustrates the deploying of a data resource component on a machine, according to some embodiments.

FIG. 8 is a flow diagram that illustrates the deploying of a data resource component on a machine, according to some embodiments. By way of example, the configuration process may have determined a need to deploy a particular version of a data resource component on a machine as specified in an abstract configuration of a system. In block 802, the configuration process determines a data resource component to deploy on a machine. The data resource component corresponds to a particular version of the data resource component. In block 804, the configuration process invokes the up/down tool and, in particular, the up/down process of the up/down tool provided with the data resource component to deploy the data resource component on the machine. In block 806, the configuration process checks to determine whether the up/down tool invoked in block 804 successfully deployed the data resource component on the machine.

If, in block 806, the configuration process determines that the invoked up/down tool successfully deployed the data resource component on the machine, then the configuration process stops processing. Otherwise, if the configuration process determines that the invoked up/down tool was unable to successfully deploy the data resource component on the machine, then, in block 808, the configuration process retrieves from the up/down tool provided with the data resource component an indication of the desired version of the data resource component to deploy on the machine. The configuration process requests the up/down tool to provide the contents of the version identifier provided with the data resource component.

In block 810, the configuration process identifies a previously saved up/down tool. The previously saved up/down tool is the up/down tool that was used to deploy the version of the data resource component that is currently installed on the machine. In block 812, the configuration process invokes the previously saved up/down tool that was identified in block 810 to deploy the data resource component on the machine. In block 814, the configuration process checks to determine whether the previously saved up/down tool invoked in block 812 successfully deployed the data resource component on the machine. If, in block 814, the configuration process determines that the previously saved up/down tool that was invoked successfully deployed the data resource component on the machine, then the configuration process stops processing. Otherwise, if the configuration process determines that the previously saved up/down tool that was invoked was unable to successfully deploy the data resource component on the machine, then, in block 816, the configuration process reports the error condition. For example, the configuration process may display an error page and/or create an error log entry that indicates that the configuration process was unable to successfully deploy the desired data resource component on the machine.

Figure 9:
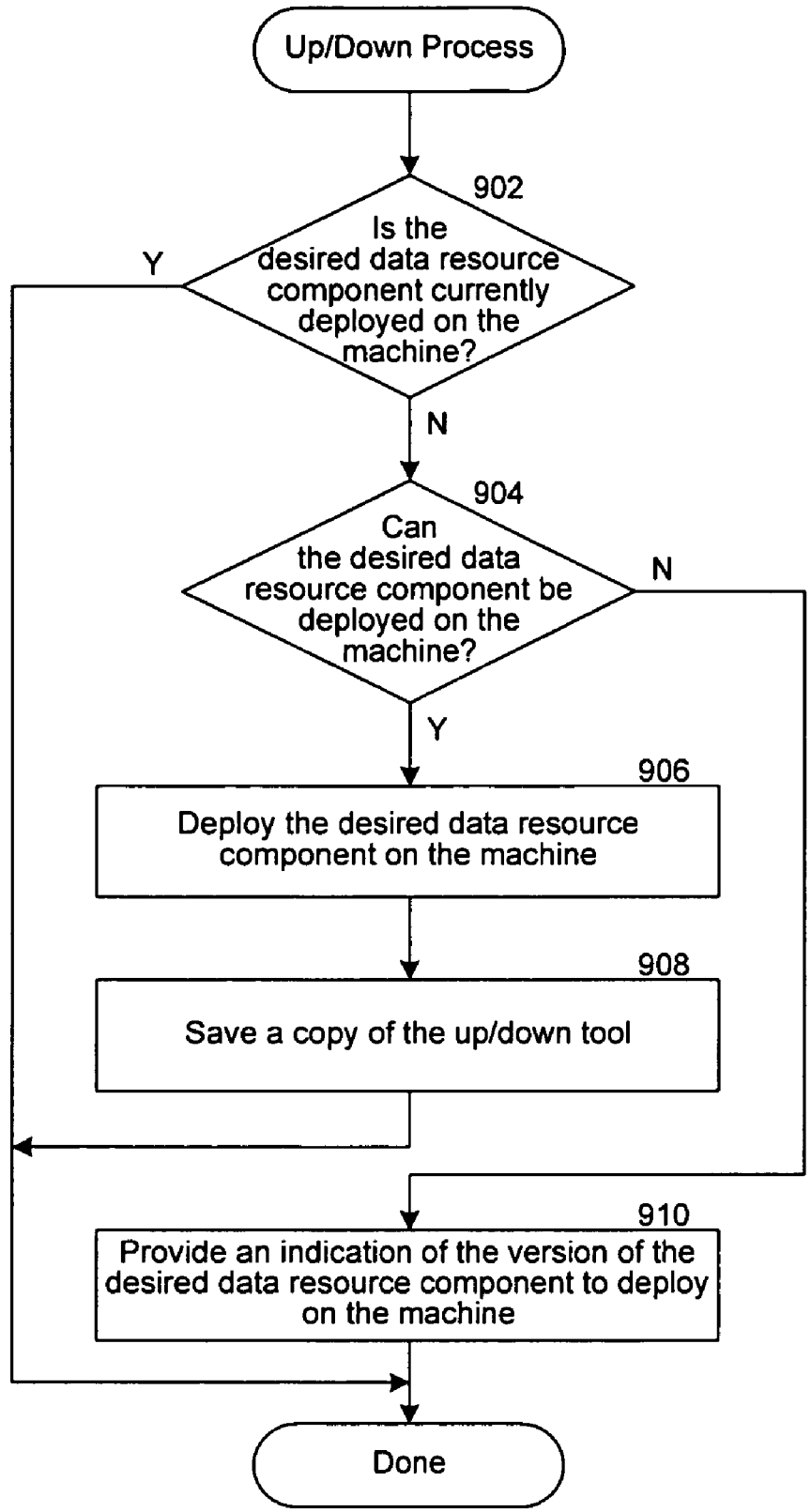
FIG. 9 is a flow diagram that illustrates the processing of the up/down process, according to some embodiments.

FIG. 9 is a flow diagram that illustrates the processing of the up/down process, according to some embodiments. In block 902, the up/down process checks to determine whether the desired data resource component is currently deployed on the machine. For example, an up/down process of an up/down tool that is provided as part of a data resource component corresponding to version 2 of a database server is able to determine from the version identifier component of the up/down tool that the desired data resource component is version 2 of the particular database server. If the up/down process determines that the desired data resource component is currently deployed on the machine, the up/down process stops processing.

Otherwise, if, in block 902, the up/down process determines that the desired data resource component is not currently deployed on the machine, then, in block 904, the up/down process checks to determine whether it can deploy the desired version of the data resource component on the machine. Here, there is either (1) a different version of the desired date resource component is deployed on the machine, or (1) no versions of the data resource component deployed on the machine. For either situation, the up/down process checks the version conversion rules that are included in the up/down tool to determine whether the appropriate version conversion rules for deploying the desired data resource component are provided. For example, assuming that the desired data resource component is version 3 of a database server and that version 2 of the database server is currently deployed on the machine, the up/down process checks the up/down tool to determine whether the version conversion rules for upgrading the database server from version 2 to version 3 are provided. Similarly, assuming that there are no versions of the database server currently deployed on the machine, the up/down process checks the up/down tool to determine whether the version conversion rules for upgrading the database server from version 0 to version 3 (i.e., newly installing version 3 of the database server) are provided.

If, in block 904, the up/down process determines that it can deploy the desired version of the data resource component on the machine, then, in block 906, the up/down process deploys the desired data resource component on the machine. The up/down process may deploy the desired data resource component by invoking the appropriate version conversion rules that are provided with the up/down tool. In block 908, the up/down process saves a copy of the up/down tool (i.e., the components of the up/down tool). For example, the up/down process may save a copy of the up/down tool in persistent memory, such as a disk, database, etc., in an area that is accessible by the deployment facility. The saved up/down tool may be later invoked, for example, by the configuration process, in an attempt to deploy a particular version of a data resource component (e.g., blocks 810 and 812 of FIG. 8).

Otherwise, if, in block 904, the up/down process determines that it cannot deploy the desired version of the data resource component on the machine, then, in block 910, the up/down process provides an indication of the desired version of the data resource component to deploy on the machine. The indication of the desired version of the data resource component may subsequently be used by the configuration process to determine whether another up/down tool can deploy the desired version of the data resource component on the machine (e.g., block 808 of FIG. 8).

Figure 10:
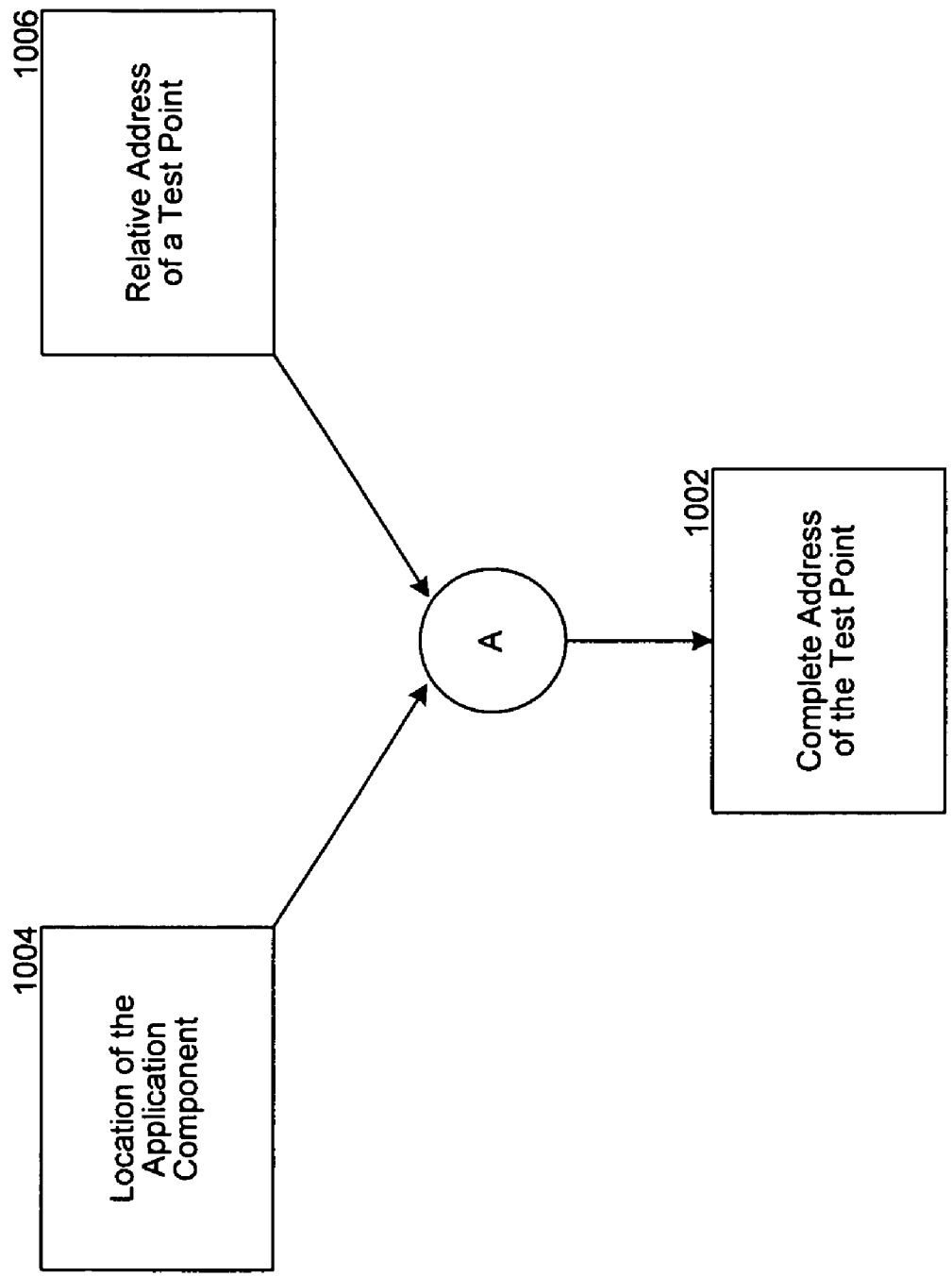
FIG. 10 is a block diagram illustrating components of a test point address, according to some embodiments.

FIG. 10 is a block diagram illustrating components of a test point address, according to some embodiments. As depicted, a complete address of the test point 1002 is formulated using a location of the application component 1004 and a relative address of the test point 1006. A test point may be provided for an application component and, if provided, may be an object that provides an indication of the current health of an instance of the application component executing on a machine. The application component provides the relative address of the test point, which is an address that is relative to the application component. For example, the developer of the application component is able to specify a test point that may be invoked or accessed to determine the health of the application component. While the developer is able to provide a relative address of the test point, the developer is unable to provide a complete address of the test point because the developer does not know the address or location of the machine or machines that are to host the application component. The machines on which the application component is to be deployed are specified in the abstract configuration of the system. Therefore, the complete address of the test point can be determined from the location of the application component (i.e., the location of the machine or machines on which the application component is to be deployed) as specified in the abstract configuration, and the relative address of the test point as specified in the application component.

Figure 11:
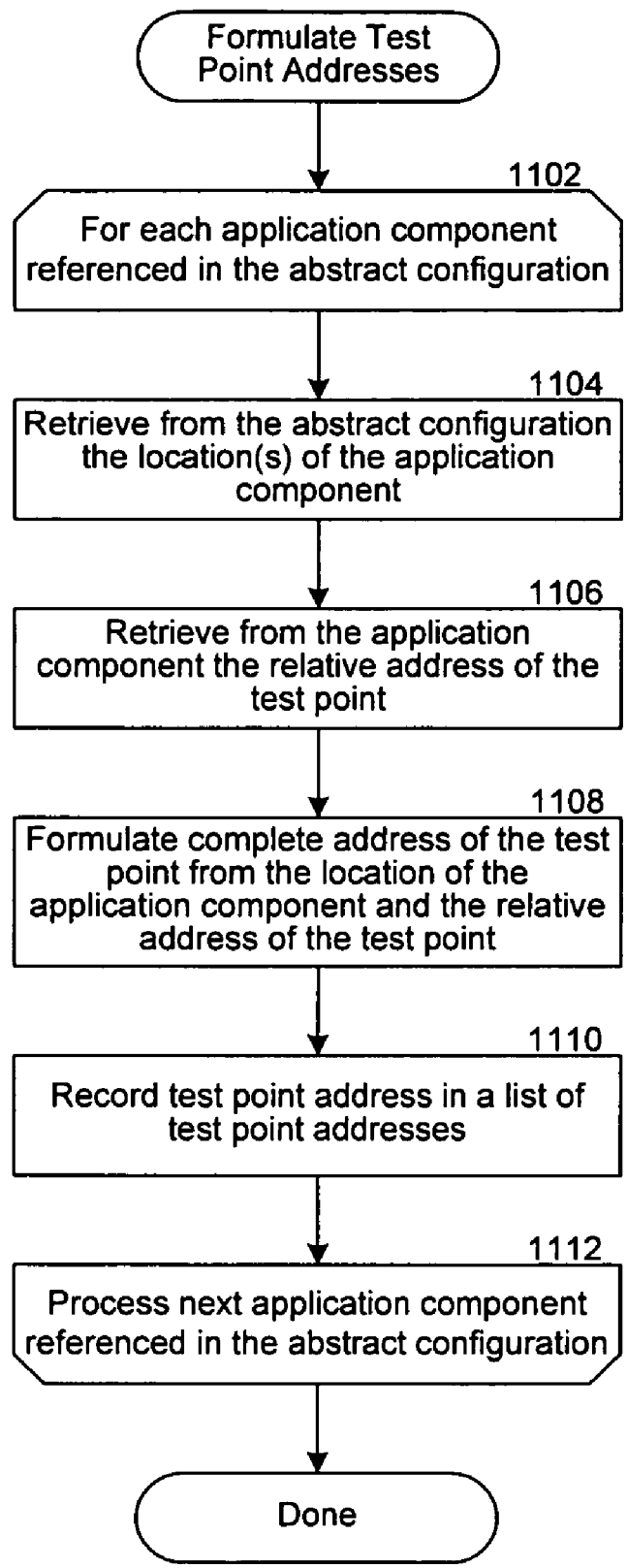
FIG. 11 is a flow diagram that illustrates the formulation of test point addresses, according to some embodiments.

FIG. 11 is a flow diagram that illustrates the formulation of test point addresses, according to some embodiments. For each application component referenced in the abstract configuration of a system (block 1102), a process, such as a system monitoring process that is interested in determining the health of the application components deployed within the system, performs blocks 1104 to 1110, until all the application components referenced in the abstract configuration are processed (block 1112). In block 1104, the system monitoring process retrieves and/or determines from the abstract configuration the location or locations of the application component. For example, the location may be the address of a machine, or the addresses of the machines, on which the application component is to be deployed. In block 1106, the system monitoring process retrieves and/or determines from the referenced application component the relative address of a test point. In block 1108, the system monitoring process formulates the complete address or addresses of the test point from the location or locations of the application component (block 1104) and the relative address of the test point (block 1106). In block 1110, the system monitoring process records the complete address or addresses of the test point in a list of test point addresses. The system monitoring process then proceeds to process the next application component that is referenced in the abstract configuration. In some embodiments, one or more application components referenced in the abstract configuration may not provide a test point and, according, a relative address for the test point. For these application components for which no test point is provided, the system monitoring process is not able to retrieve from the application component the relative address of the test point (block 1106) and therefore, does not perform blocks 1108 and 1110.

Figure 12:
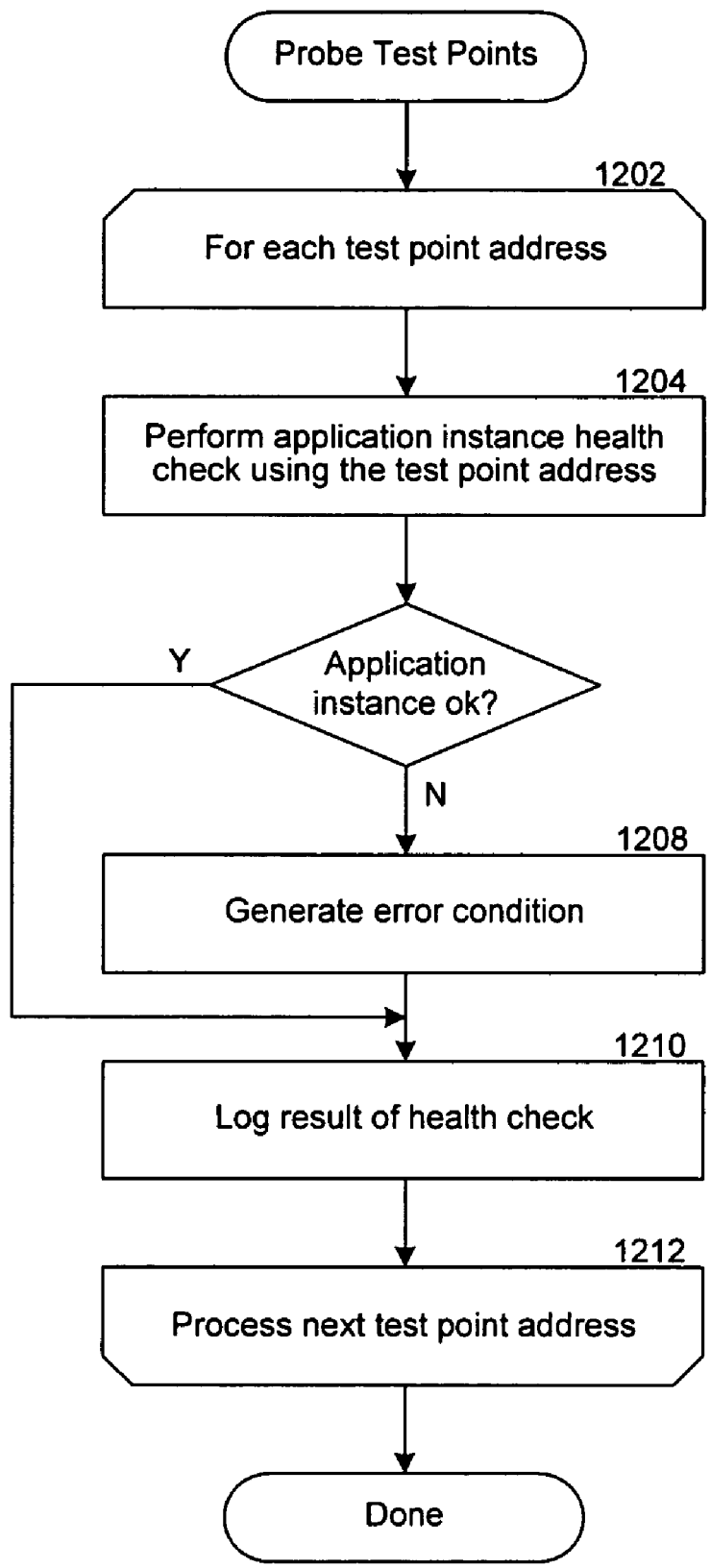
FIG. 12 is a flow diagram that illustrates the probing of test points, according to some embodiments.

FIG. 12 is a flow diagram that illustrates the probing of test points, according to some embodiments. By way of example, the system monitoring process may periodically probe each test point address in the list of test point addresses upon formulating the list of test point addresses. For each test point address in the list of test point addresses (block 1202), the system monitoring process performs blocks 1204 to 1210, until all the test point addresses in the list of test point addresses are processed (block 1212). In block 1024, the system monitoring process performs an application instance health check using the test point address. For example, the system monitoring process probes (e.g., invokes, retrieves, etc.) the test point at the test point address to perform a check of the health of the application instance associated with the probed test point. In block 1206, the system monitoring process checks the contents of the test point to determine whether the application instance is currently healthy. If, in block 1206, the system monitoring process determines that the application instance is not healthy, then, in block 1208, the system monitoring process generates an error condition. In some embodiments, the system monitoring process may generate an error condition that causes one or more users to be notified of the unhealthy state or condition of the application instance.

For example, the users may be sent a notification, such as a page, text message, voice message, email message, wired or wireless telephone call, etc., which alters the users of the unhealthy state or condition of the application instance. The notification may also include information regarding the cause of the unhealthy state or condition of the application instance.

Subsequent to generating the error condition (block 1208), or upon determining in block 1206 that the application instance is healthy, the system monitoring process, in block 1210, logs the result of the health check. For example, the system monitoring process may log the result of the health check, including an indication of the application instance and the time of the heath check, in a log file. The system monitoring process then proceeds to process the next test point address in the list of test point addresses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computing system with a processor and a memory for deploying a complex system, the method comprising:
    providing an abstract configuration of a system a desired state of the system, the abstract configuration referencing machines and their machine types that comprise the system, application components that are to execute on each machine, resources needed by each application component, and locations of the resources;
    for each application component, providing a deployment descriptor specifying resources required by that application component to execute properly;
    formulating by the computing system a list of resources required by the referenced application components of the abstract configuration of the system as specified by the deployment descriptors;
    determining by the computing system whether all the resources in the formulated list of resources are referenced in the abstract configuration of the system by comparing the formulated list of resources to the resources referenced in the abstract configuration;
    upon determining that not all the resources are referenced in the abstract configuration of the system, generating an error; and
    upon determining that all the resources are referenced in the abstract configuration of the system,
        determining by the computing system whether the referenced machines exist and are the proper machine type; and
        upon determining that the referenced machines exist and are the proper type, for each referenced machine:
            identifying by the computing system deployed application components that are currently deployed on the referenced machine;
            identifying by the computing system referenced application components to be deployed to the referenced machine as indicated by the abstract configuration;
            comparing by the computing system the identified deployed application components to the identified referenced application components to determine the application components to be deployed to the referenced machine; and
            deploying the determined referenced application components on the referenced machine.

2. The method of claim 1, wherein deploying the referenced application components on the referenced machines comprises installing at least one referenced application component on at least one reference machine.

3. The method of claim 1, wherein deploying the referenced application components on the referenced machines comprises deleting an improper version of at least one referenced application component on at least one referenced machine.

4. The method of claim 1, wherein deploying the referenced application components on the referenced machines comprises changing an application component already deployed on at least one referenced machine from a first version to a second version.

5. The method of claim 1, wherein at least one referenced application component is a software component.

6. The method of claim 1, wherein at least one referenced application component is a data resource component.

7. A computer-readable storage medium storing computer-executable instructions for controlling a computing system to deploy a complex system, by a method comprising:
    receiving as input an abstract configuration of a system specifying a desired state of the system, the abstract configuration specifying machines and their machine types that comprise the system. application components that are to execute on each machine, resources needed by each application component, and locations of the resources;
    for each application component, providing a deployment descriptor specifying resources required by that application component to execute properly;
    for the application components specified in the abstract configuration, formulating by the computing system a list of the resources required by the application components based on the provided deployment descriptors of the application components;
    comparing the formulated list of resources to the resources specified in the abstract configuration of the system to determine whether the abstract configuration correctly specifies the resources needed by the specified application components;
    upon determining that the abstract configuration does not correctly specify the resources needed by the specified application components, generating an error message; and
    upon determining that the abstract configuration does correctly specify the resources needed by the specified application components, determining by the computing system whether the specified machines exist and are the error machine type; and
        upon determining that the specified machines exist and are the proper type, for each specified machine:
            identifying by the computing system deployed application components that are currently deployed on the specified machine;
            identifying by the computing system specified application components to be deployed to the specified machine as indicated by the abstract configuration;
            comparing by the computing system the identified deployed application components to the identified specified application components to determine the application components to be deployed to the specified machine; and
            deploying the determined specified application components on the specified machine.

8. The computer-readable storage medium of claim 7 further comprising, upon determining that an application component is not deployed on a machine as specified by the abstract configuration of the system, creating an instance of the application component on the machine.

9. The computer-readable storage medium of claim 8, wherein creating the instance of the application component on the machine comprises installing the application component on the machine.

10. The computer-readable storage medium of claim 8, wherein creating the instance of the application component on the machine comprises changing the instance of the application component from a first version to a second version.

11. The computer-readable storage medium of claim 7, wherein at least one of the application components specified in the abstract configuration of the system is a software application.

12. The computer-readable storage medium of claim 7, wherein at least one of the application components specified in the abstract configuration of the system is a data resource.

13. A deployment system for deploying a complex system, the deployment system comprising:
 a memory storing computer-executable instructions of
  an abstract configuration of a system specifying a desired state of the system by specifying one or more application components and one or more machines, the abstract configuration further specifying the application components and resources to deploy on each of the machines;
  an application component library comprising at least one application component, the application component comprising a deployment descriptor and program components, wherein the deployment descriptor specifies the resources required by the application component, and further wherein the program components are the logic for the application component; and
  a configuration component that is operable to read the abstract configuration and
   determine from the deployment descriptors the resources required by the application components specified in the abstract configuration;
   determine whether the required resources are referenced in the abstract configuration of the system;
   upon determining that the required resources are not referenced in the abstract configuration of the system, generating an error; and
   upon determining that the required resources are referenced in the abstract configuration of the system,
    determining whether the machines referenced in the abstract configuration exist;
    upon determining that not all the machines referenced in the abstract configuration exist, generating an error; and
    upon determining that all the machines referenced in the abstract configuration exist, indicating that the abstract configuration is valid; and
 a processor for executing the computer-executable instructions stored in the memory.

14. The deployment system of claim 13, wherein the configuration component is further operable to determine that the application components specified in the abstract configuration of the system are included in the application component library.

15. The deployment system of claim 13, wherein the configuration component is further operable to determine that the machines specified in the abstract configuration of the system exist.

16. The deployment system of claim 13, wherein the configuration component is further operable to, upon determining the presence of the application components specified in the abstract configuration of the system in the application component library and the existence of the machines specified in the abstract configuration of the system, deploy the application components on the machines as specified by the abstract configuration of the system.

* * * * *